United States Patent [19]

Khanna et al.

[11] 4,135,127

[45] Jan. 16, 1979

[54] DIRECT CURRENT TRANSFORMER

[76] Inventors: James C. Fletcher, Administrator of the National Aeronautics and Space Administration, with respect to an invention of Shyam M. Khanna, Ottawa, Canada; Eugene W. Urban, Huntsville, Ala.

[21] Appl. No.: 782,462

[22] Filed: Mar. 29, 1977

[51] Int. Cl.$^2$ .............................................. G05F 7/00
[52] U.S. Cl. .......................... 323/44 F; 336/DIG. 1
[58] Field of Search ................ 323/44 F; 336/DIG. 1

[56] References Cited

U.S. PATENT DOCUMENTS

| 2,938,160 | 5/1960 | Steele | 323/44 F |
|---|---|---|---|
| 2,987,631 | 6/1961 | Park | 323/44 F |
| 3,394,317 | 6/1968 | Giaver | 323/44 F |
| 3,443,255 | 5/1969 | Massar | 323/44 F |
| 3,790,880 | 2/1974 | Solomon | 323/44 F |

FOREIGN PATENT DOCUMENTS 6613761  4/1967  Netherlands .................. 336/DIG. 1

*Primary Examiner*—A. D. Pellinen
*Attorney, Agent, or Firm*—George J. Porter; John R. Manning; L. D. Wofford, Jr.

[57] ABSTRACT

A direct current transformer in which the primary consists of an elongated strip of superconductive material, across the ends of which is applied a direct current potential. Parallel and closely spaced to the primary is positioned a transformer secondary consisting of a thin strip of magnetoresistive material.

2 Claims, 3 Drawing Figures

DIRECT CURRENT TRANSFORMER

ORIGIN OF THE INVENTION

The invention described herein was made in the performance of work under a NASA contract and is subject to the provisions of Section 305 of the National Aeronautics and Space Act of 1958, Public Law 85-568 (72 stat. 435;42 USC 2457).

BACKGROUND OF THE INVENTION

1. Field of the Invention

This invention relates to a direct current transformer, and particularly to a transformer in which the secondary winding is made of a magnetoresistive material.

2. General Description of the Prior Art

The D.C. transformer was invented by Giaever in 1965, and in its simplest form, consists of closely spaced, but insulated, thin films of superconductive material, one constituting a primary and the other the secondary of the transformer. Typically, the windings are magnetically biased by an auxiliary magnet or electromagnet and the assembly placed in liquid helium to lower the temperature to approximately 4° K. (−269° C.), and thus to produce superconductivity in the transformer windings and in the electromagnet. Superconductive materials are diamagnetic, and thus initially the magnetic field does not penetrate the windings. However, when the flux level present is raised above a critical value, magnetic vortices pass through the primary. Then, by virtue of the application of current to the primary winding, the magnetic vortices are caused to be moved at right angles to the current flow, and thus there is created a moving magnetic field. Alternatively in the absence of an auxiliary magnet, the vortices result from the primary current itself. The moving magnetic field is coupled to the secondary by virtue of its close proximity, and it thereby produces an output potential across the secondary which is a function of the applied current.

There are several disadvantages with existing D.C. transformers, and these may be summarized as follows:

1. The vortices in the secondary area experience a pinning force which opposes flux motion in the secondary. As a result, transformer action is restricted to rather high values of current and applied magnetic fields. At low currents and fields, the flux motion of the primary is not as effective in causing flux motion in the secondary.

2. The superconductive type transformer will not work at temperatures higher than the transition temperature of the secondary.

It is an object of this invention to overcome the aforesaid difficulties and to generally provide an improved D.C. transformer.

It is a specific object of this invention to provide a D.C. transformer in which the magnetic flux flow in the primary will result in a space modulated flux motion in a magnetoresistive secondary.

A still further object of this invention is to provide a D.C. transformer in which there is a net flux flow voltage across both the primary and secondary due to space modulated flux motion across them.

SUMMARY OF THE INVENTION

In accordance with this invention, the conventional superconductive secondary of a D.C. transformer is replaced by a secondary of magnetoresistive material. The secondary is best constructed of a thin film sufficiently close to the primary so that it can substantially experience the flux flow in the primary, the primary and secondary being separated by a thin layer of insulating material. While there is no basic restriction on the particular characteristics of the superconductive primary, it has been determined that thin foils of type 1 superconductive material are good choices, one example being a high purity lead. The secondary may be of any material which is magnetoresistive at liquid He temperature, approximately 4° K. (−269° C.), and would include Bi, InSb, Al, In, and Na.

DETAILED DESCRIPTION OF THE DRAWINGS

Figure 1:
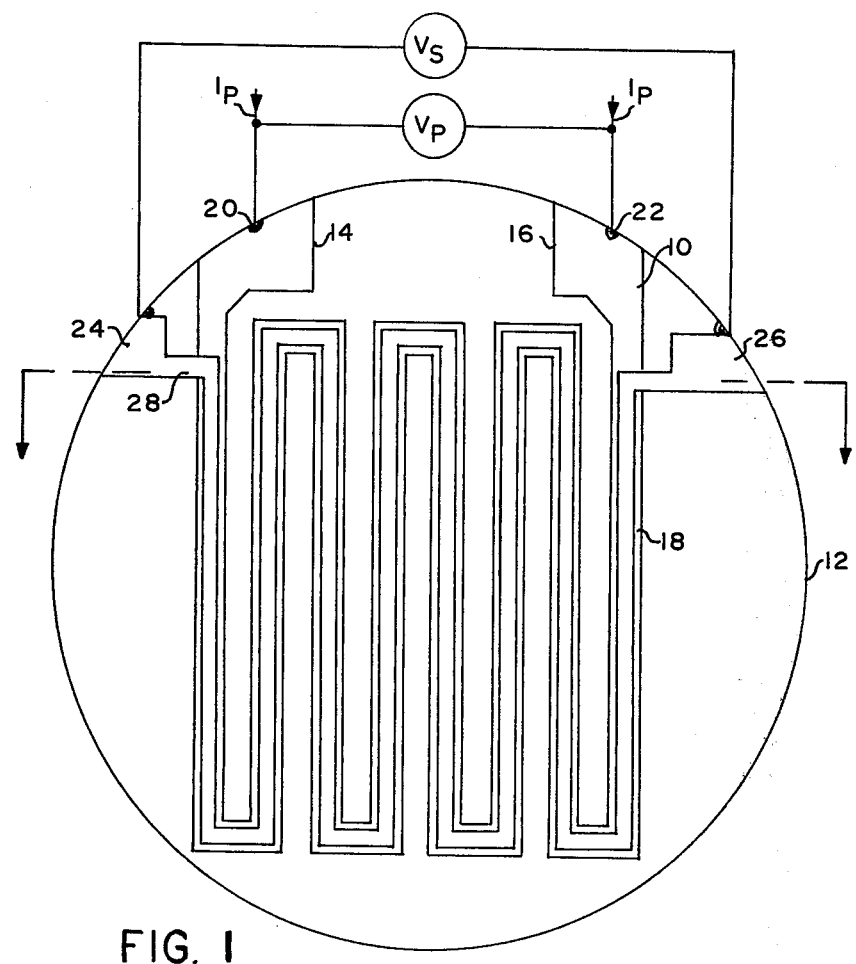
FIG. 1 is a plan view of an arrangement of electrical conductors and a supporting structure for the transformer.
Figure 2:
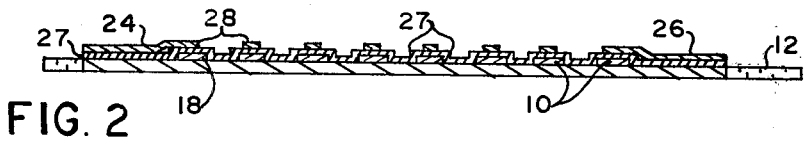
FIG. 2 is a sectional view along lines 2—2 of FIG. 1.

Referring initially to FIGS. 1 and 2, transformer primary 10 consists of a thin foil of high purity lead which is mounted on bakelite or other insulator substrate 12. In the illustrated example, the length of the primary would be approximately 1,250 millimeters, the foil would have a width of 2.5 to 5.0 millimeters, and would be of a thickness of 0.250 to 2.5 millimeters. Two steps or notches (not shown) may be cut in substrate 12 at locations 14 and 16 of the ends of primary foil 18, in which case the foil would be bent to conform to the steps. Primary terminals 20 and 22 are formed at the ends of the primary foil. Next, metal secondary terminal strips 24 and 26 are attached on substrate 12, being insulated from primary 10. Next, an insulating film 27 is coated over the primary, leaving the top of the metal primary terminal strips 20 and 22 bare. The thickness of the insulating film would range from 2,000 to 10,000 angstrom units. Finally, a transformer secondary in the form of a thin film of e.g., InSb, is applied on the insulating layer and just over the primary, and having, as shown, slightly less width than the primary, and being centered with respect to the primary. The dimensions of the secondary film would be approximately 2.5 to 4.0 millimeters in width, approximately 10,000 to 50,000 angstrom units in thickness, and of the same length as the primary in this example, 1,250 millimeters.

Figure 3:
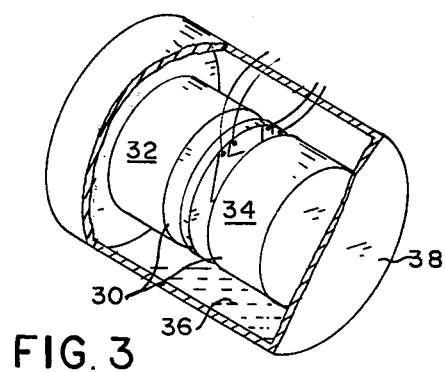
FIG. 3 is a pictorial view of the overall structure of a transformer contemplated by this invention.

As shown in FIG. 3, the sandwich consisting of the primary, insulation, secondary, and substrate may, if desired, be placed in bias electromagnetic coil assembly 30, consisting of coil halves 32 and 34 (powered by the shown leads). Typically, the conductors of the electromagnetic assembly would be made of superconductive material. Actual superconductivity in coils 32 and 34, primary 10, and a high value of magnetoresistivity in secondary 28 is effected by placing these elements in liquid helium 36 within container 38. Note that the source of the bias magnetic field, if used, is not critical to this invention. It could consist of a conventional magnet or electromagnet outside of the liquid helium container.

As thus effected, primary 10 will have been cooled below its superconductive transition temperature, and in such state will be penetrated by the magnetic flux from coil assembly 30. Typically, the magnitude of the bias field applied by magnetic coil assembly 30 is such that the so-called pinning forces which inhibit flux motion in the primary are reduced. When current $I_P$ is applied through primary 10, additional flux (so-called self field) is produced in and around the primary. Also due to the current $I_P$, a force on the total flux in the primary is generated. When this force exceeds the pinning force, there occurs a moving field as described above in accordance with known principles of D.C. transformer effect. In some applications, the applied bias field may be omitted and a force above the pinning force achieved simply by transport direct current $I_P$ through primary winding 10.

In accordance with this invention, the moving field achieved in the primary is coupled to the secondary which, although not a superconductive material, but a magnetoresistive material, responds by the generation of a potential across it $V_S$. To effect different ratios of the voltage transformation, known techniques of adjusting turns ratios and coupling may be employed.

As discussed above, thin films of any type of superconductive material may be used for the primary. Materials with higher critical fields are the most suited. Thus, in addition to Pb, one may also use Sn or In foils for the primary. Similarly, any material which is magnetoresistive at liquid helium temperature in thin film (foil) form may be used for the secondary. Other materials for the secondary may be Bi, InAs, Al, In, Ag, etc.

The basic purpose of this invention is to extend the operation of the D.C. transformer to a new class of materials which leads to several advantages as follows:

1. Unlike the earlier conventional D.C. transformer, there is no critical "transition" temperature of the secondary in the new transformer above which the transformer will not work. Thus, the new transformer will function at all temperatures below the superconductive transition temperature of the primary.

2. The secondary material in the new transformer has no vortex structure and hence no associated pinning of vortices in it, the principal problem of using superconductive secondaries. In other words, the force which opposes flux motion across the secondary is much reduced in the new transformer. This is in strong contrast to the situation with superconductive secondaries wherein the driving force provided by the moving flux pattern in the primary had to exceed the pinning force on the vortices in the secondary for flux motion to occur across it. Such a problem does not exist in the new transformer.

3. Eddy current losses in regions where flux changes occur during flux motion in the magnetoresistive secondary are much reduced in the new transformer from similar losses in previous superconductive D.C. transformers. This thus enables a higher efficiency to be achieved.

Having thus disclosed our invention, what is claimed is:

1. A direct current transformer comprising:
   a primary electrical conductor having a pair of opposite ends comprising transformer input terminals;
   a source of D.C. signal, $I_P$, connected across said terminals, whereby a direct magnetic field is provided;
   the material of said primary electrical conductor and level of said D.C. signal $I_P$ being such that said primary electrical conductor is superconductive in the presence of said signal $I_P$, and that said signal $I_P$ rises at least to the critical level for said superconductive material, whereby moving vortices are created in said primary electrical conductor;
   a secondary electrical conductor of a magneto-resistive material, said secondary conductor being positioned closely adjacent to, but electrically insulated from, said first conductor, and having a pair of unbiased end terminals; and
   environmental means for applying a low temperature to said primary and secondary electrical conductors, said temperature being no higher than the superconducting transition of said primary electrical conductor;
   whereby D.C. potential $V_S$ appears across said terminals of said secondary conductor responsive to the application of said signal $I_P$ across said terminals of said primary electrical conductor.

2. A direct current transformer as set forth in claim 1 further comprising bias means for applying a second magnetic field to said primary and secondary conductors, whereby together the applied magnetic fields produce a magnetic field which penetrates said primary and secondary conductors, and said magnetic fields do not exceed a value which would render said primary non-superconductive.

* * * * *